United States Patent [19]

Baldwin et al.

[11] Patent Number: 4,870,538

[45] Date of Patent: Sep. 26, 1989

[54] HIGH ENERGY DENSITY CAPACITOR AND METHOD OF FABRICATION

[75] Inventors: Ewart M. Baldwin, La Mesa; U. Veereswara Rao, Irvine; Thomas C. Bender, San Diego, all of Calif.

[73] Assignee: Enercap Corporation, San Diego, Calif.

[21] Appl. No.: 249,405

[22] Filed: Sep. 26, 1988

[51] Int. Cl.$^4$ .......................... H01B 3/12; H01G 7/00
[52] U.S. Cl. .................................. 361/321; 29/25.42; 361/329
[58] Field of Search ............... 361/321, 329; 29/25.42; 264/61; 501/135-138; 357/10; 252/520

[56] References Cited

U.S. PATENT DOCUMENTS

| | | | |
|---|---|---|---|
| 1,327,593 | 1/1920 | Dubilier | 361/329 |
| 3,890,546 | 6/1975 | Coleman | 361/329 X |
| 4,148,853 | 4/1979 | Schuber | 501/138 X |
| 4,149,173 | 4/1979 | Schmelz et al. | 361/321 X |
| 4,228,482 | 10/1980 | Bouchard et al. | 361/313 X |
| 4,477,401 | 10/1984 | Hagemann et al. | 264/61 |
| 4,612,689 | 9/1986 | de Wild et al. | 361/321 X |

Primary Examiner—Donald A. Griffin
Attorney, Agent, or Firm—Henry M. Bissell

[57] ABSTRACT

A high energy density capacitor comprises a plurality of individual capacitor chips connected in parallel circuit to achieve a unit with improved series resistance and inductance and having the capability of delivering its stored energy in extremely short discharge times and providing high energy electrical pulses with extremely short rise times. The chips are fabricated of a ceramic material of the $ABO_3$ perovskite type where A belongs to a divalent cationic species such as Mg, Ca, Ba, and Sr; B belongs to a quadrivalent species such as Ti, Sn, Pb, and Zr; and O represents oxygen. The perovskite material is preferably prepared from oxides, carbonates, oxalates and the like materials. A novel method of fabrication of the capacitive chips includes a first sintering step followed by hot isostatic pressing under predetermined times, temperatures, pressures and gaseous mixtures which are related to the particular material compositions being procesed. The resulting chips are assembled with suitable electrically conductive leads in a compact capacitor array which is encapsulated in an insulating medium for stability and permanence.

29 Claims, 1 Drawing Sheet

U.S. Patent  Sep. 26, 1989  Sheet 1 of 2  4,870,538
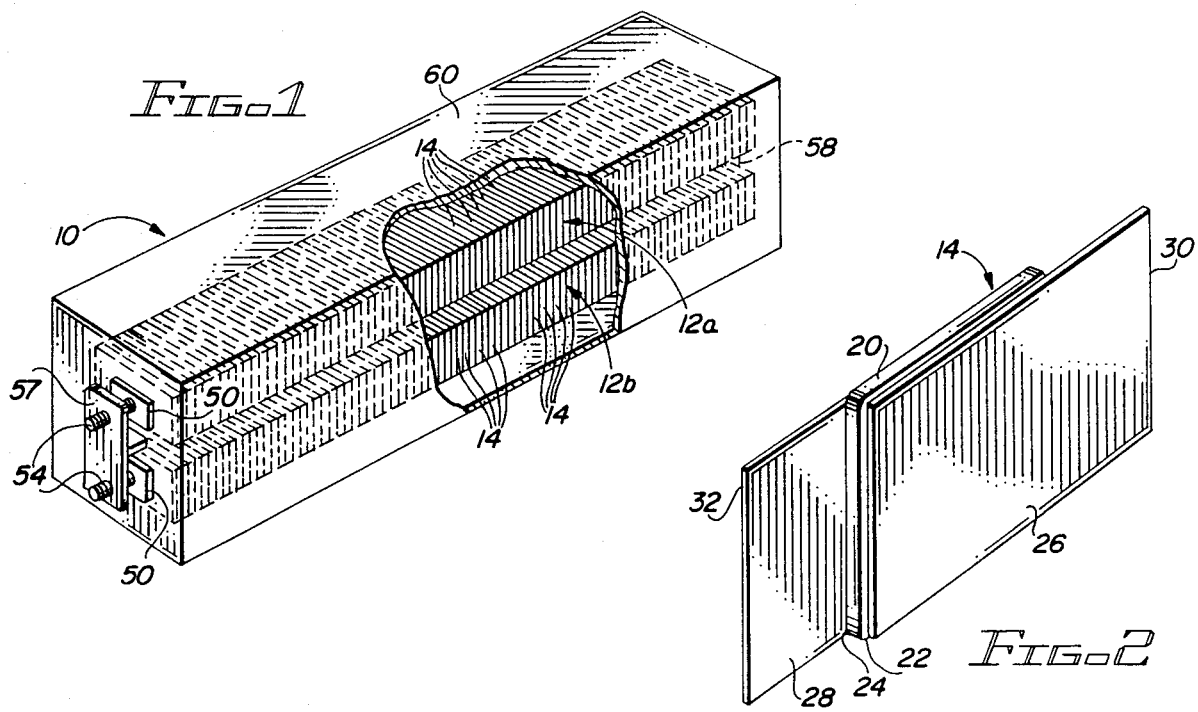
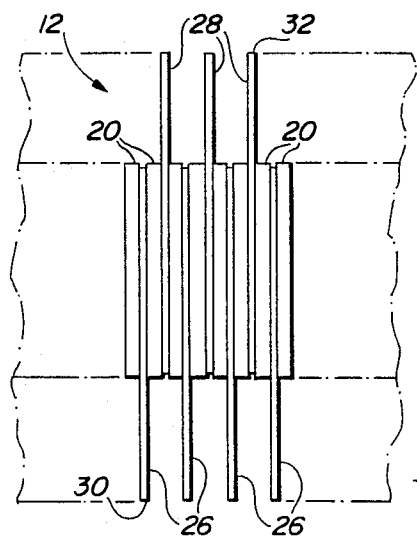
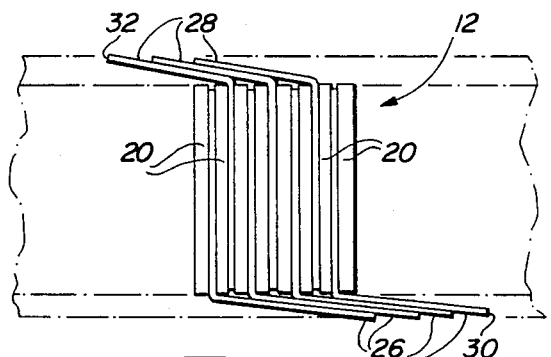
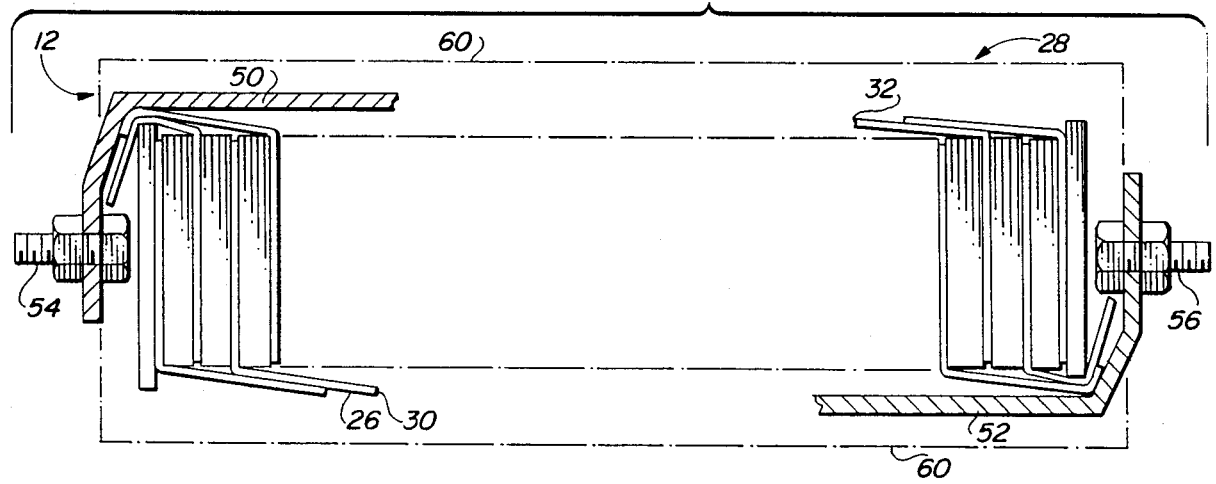

HIGH ENERGY DENSITY CAPACITOR AND METHOD OF FABRICATION

BACKGROUND OF THE INVENTION

1. Field of the Invention

This invention relates to the fabrication of electrical capacitors and, more particularly, to specific high energy density capacitors and the method of fabrication thereof.

2. Description of the Related Art

Capacitors, initially and still commonly known as condensers, are one of the earliest electrical components known. They are fabricated in many different forms, shapes, sizes and types according to their particular circuit application. Their essential property, electrical capacitance, is an electrostatic phenomenon and is concerned with the storage of electrical charge and the behavior of electrons at rest. A capacitor consists essentially of two parallel plates which possess a certain capacity to store electric charge. Charges are stored on the surfaces of the two plates which are separated by a space or gap which is usually filled with some insulating material (the dielectric). The stored charges create an electrostatic field between the plates which serves to polarize the dielectric corresponding to the voltage across the plates, to which the terminals of the capacitor are formed for connection to an external circuit. The effectiveness of a given dielectric material in determining the capacitance of the component, compared with the capacitance when an air gap exists between the plates, is called the relative permittivity or dielectric constant of the material.

Barium titanate is one example of a ceramic material having a very high dielectric constant, normally in the range of 2000–12000, depending on the formation of the material, when the barium titanate is compounded with other additives. It also possesses other properties which make it an appropriate candidate as the dielectric in capacitors for storing charge at high voltages.

Because of the control which can be exercised over the chemical composition of ceramic dielectrics, there is a resulting range in possible capacitor properties. The high dielectric constants which can be achieved result in a very high capacitance per unit volume, but many of these are low voltage types. One widely used ceramic material is the rutile type, which contains varying proportions of titanium oxide and magnesium orthotitanate by which the temperature coefficient of capacitance can be closely controlled.

An extensive description of the background and methods of fabrication of ceramic capacitors, among others, is contained in an article by Donald M. Trotter, Jr. entitled "Capacitors", pp. 86ff of *Scientific American*, July 1988. The disclosure of that article is incorporated herein by reference.

Brown and Fischer of the U.S. Army Signal and Research Development Laboratory, in USASRDL Technical Report 2196 entitled "Properties of Hot-Pressed Barium Titanate", April, 1961, disclose that significant improvements can be achieved in the electrical properties of mechanically hot-pressed barium titanate samples prepared in the manner described in the report, as compared with conventionally prepared samples. Increases in dielectric strength from two and one-half to five times are claimed, as well as significant improvement in dielectric constant at operating temperatures below the Curie temperature. The report describes the processing of the barium titanate as involving the use of ceramic dies in a hydraulic laboratory press, the platen of which was mounted within an induction furnace. Pressures of 5000 psi were applied throughout a heating cycle having a peak temperature of 2000 degrees F.

Sintering of ceramic materials is a step which is employed to achieve highly dense ceramics. Hot isostatic pressing (HIP or hipping), a process by which an element is surrounded by a medium at elevated pressure and temperature, is commonly employed to compress certain bodies free of the application of mechanical force for the purpose of enhancing or developing desirable properties of the body. An article entitled "Gas Isostatic Hot Pressing Without Molds" by K. H. Hardtl, *Ceramic Bulletin*, Vol. 54, No. 2 (1975) discloses such a process used with various ceramics to develop ceramic products which are essentially pore-free. Among the uses which are mentioned are transparent materials for lamp envelopes and electro-optical applications, pore-free hard metals and ceramics for cutting tools, piezoelectric ceramics for surface wave filters, electric heating elements, magnetic recording heads and the like. In particular, the article describes a process applied to perovskites, ferrites or garnets. A normal sintering procedure is first employed to develop specimens with a closed porosity and a density in excess of 90% of theoretical. Thereafter, the specimen undergoes a HIP process to essentially eliminate the closed porosity. The article describes densifying to virtually theoretical density of various ceramics of $BaTiO_3$, $SrTiO_3$, $Pb(Zr,Ti)O_3$, $Al_2O_3$, $Y_3Fe_5O_{12}$(YIG), Mn-Zn ferrite and Ni-Zn ferrite. The article apparently is concerned with only the physical properties of the specimens undergoing the HIP process and makes no mention of any electrical properties of the materials involved.

In the HIP process described by Hardtl, the normally sintered ceramic solid is placed in the furnace (which is a water cooled autoclave) and the autoclave is closed in air. The working gas (specified as either nitrogen or argon) is pumped in up to a pressure of about 60% of the final pressure and then the furnace is heated to the desired maximum temperature in about 30 minutes. Because of the heating, the pressure inside rises to the desired maximum pressure and a control valve insures constancy of pressure. Cooling takes place over a period of about 30 minutes after hipping is concluded. The disclosure of the Hardtl article is incorporated herein by reference.

Modern apparatus for HIP consists of a high temperature furnace enclosed in a water-cooled autoclave which is capable of withstanding internal gas pressures up to about 45,000 psi and providing a uniform hot zone temperature up to about 2000 degrees C. (3632 degrees F.). The pressurization gas is commonly either argon or helium. Heating is usually effected by molybdenum or graphite resistance-heated elements argon or helium.

There are certain highly specialized needs for high energy density capacitors which are difficult to satisfy with presently available products. One such application is a mobile power source having the capability of providing electrical pulses at energy levels in the kilojoule to megajoule range. Under presently available technology, the volume required for such a power source is incompatible with the requirement for mobility. We have developed a design of product configuration and fabrication technique which reduces the volume of a 1 kilojoule unit to a minor fraction of one cubic foot. In order to deliver the stored energy in pulses of the desired waveform, rise time, etc., the power source should have very low series resistance and inductance. The capacitor power source of the present invention fulfills this need, providing a series resistance $R_s$ which is substantially less than that provided by presently known devices of a comparable nature.

SUMMARY OF THE INVENTION

In brief, a capacitive power source in accordance with the present invention comprises a plurality of individual capacitive chips mounted in a stacked array and interconnected to form a unitary capacitor of high energy storage density, low equivalent series resistance and low equivalent series inductance which is capable of, upon discharge, providing high energy electrical pulses with extremely short rise times and short capacitor discharge times. The fabrication of the capacitor chips involves the use of a ceramic material of the $ABO_3$ perovskite type where A belongs to a divalent cationic species such as Mg, Ca, Ba, Sr; B belongs to a quadrivalent species such as Ti, Sn, Pb, Zr; and O represents oxygen. The perovskite type material is preferably prepared from oxides, carbonates, oxalates and the like materials to yield the ceramic element possessing the desirable electrical properties.

In the fabrication of the elemental chip, a selected ceramic material, preferably one of various barium titanate compositions NPO, X7R, Z5U, and the like as classified by the Electronics Industries Association (EIA), which has been prepared to sub-micron particle size, is mixed with a binder. A typical material suitable for this use is Tamtron 262-L from Tam Ceramics, Niagara Falls, N.Y. This mixture is fabricated in tape form to achieve the desired thickness of the ultimate capacitor chip, e.g. typically within a range from about 0.001 inch to about 0.1 inch, preferably 0.02 inch or 0.04 inch, depending upon the operating voltage.

A thick film electrode is applied to each of the two opposite sides of the tape, after which the dielectric tape is cut into individual unfired capacitor parts. These unfired capacitor parts are then placed on zirconia setters and placed within a kiln These are then fired at approximately 90-98% of the peak firing temperature of approximately 1130 degrees C. for a period of from one to three hours, after which they are cooled to room temperature at a controlled rate over a period of about two hours, removed from the kiln and sorted.

The pieces prepared by this first sintering operation are then tested to design specifications and those chips which test satisfactorily are then loaded into an inert crucible with suitable separation between the pieces. The crucible with the pieces therein is placed in a presurized oven for the ensuing HIP process. In this oven, or autoclave, the pieces are fired at a selected firing temperature, e.g. approximately 25 to 150 degrees C. below the normal maturing temperature (peak firing temperature) for the duration of the maturing cycle. For example, this temperature for Tamtron 262-L is approximately 1130 degrees C. Maturing temperature may vary somewhat, depending upon the material, which is generally specified by the manufacturer for the particular material involved. The level of the firing temperature below the maturing temperature may also vary, depending on the working pressure For example, the firing temperature may vary from about 25 degrees C. below the maturing temperature at 2000 psi to about 150 degrees C. below the maturing temperature at 10,000 psi. The firing temperature is approximately 25 to 150 degrees C., preferably 50 degrees C., below the maturing temperature at a working pressure in the range of 2000 to 12000 psi.

This firing is done for a predetermined length of time (called the maturing time) in an inert gas atmosphere which contains approximately 2 to 5% oxygen. The maturing time in the HIP process is dependent on the pressure, temperature, gaseous mixture and the type of ceramic material. This inert gas may comprise helium, neon, argon, krypton, or nitrogen, or combinations thereof. The gas(es) employed is selected to preclude chemical change in the chip material during the HIP process. A typical HIP system includes means for introducing the gases used in the process and establishing the desired temperatures and pressures within the oven. Sensors and controls are provided to set and maintain the temperature and pressure of operation for the selected time. More modern equipment may even provide a profile of different temperatures and/or pressures for preset intervals of time.

After the HIP process is concluded, the firing is terminated, the pressure is reduced, and the contents of the chamber are allowed to come to room temperature.

The temperature cycle and the gases involved in the HIP process cause the molecular structure of the perovskite material, such as barium titanate composition, to develop the properties needed to achieve the high energy density storage capability of the integral capacitor in which the capacitor chips are mounted. hipped barium titanate composition exhibits a substantially higher dielectric constant than if it had not undergone the HIP process, as well as improvement in the voltage breakdown properties and voltage-capacitance characteristic.

After termination of the HIP process, the fired pieces are unloaded from the chamber and are again tested for compliance with design specifications. This procedure generally provides a very high yield of acceptable quality capacitor chips. The chips are then installed in an insulated frame, preferably fabricated of plastic, e.g., polycarbonate, together with precut solder-clad copper leads which are interconnected to provide a single integral capacitor typically comprising 50 chips in a unit. Additional units can be connected in parallel to increase the capacitance of the individual capacitor. The final step is to encapsulate the chips in an insulating medium with a high voltage breakdown point having a minimum resistance of one giga ohm.

The following is an example of specific process steps which may be used to produce capacitor chips for high energy density capacitors.

I. MIX—(Slurry) 1690 grams of Tamtron 262-L dielectric powder, 910 grams of 73210 MSI binder, 25.3 grams of M1109 MSI modifier and 25.3 grams of M1026 MSI modifier are placed into a ball mill jar that is half full of cylindrical (0.78-inch dia. $\times$ 0.78-inch high) zirconia grinding media. [MSI binders and modifiers are available from Metoramic Sciences, Inc. of Carlsbad, Calif.] After a 24-in. Hg vacuum is created within the jar, it is placed on a roll mill and mixed for 16 hours at 32 RPM.

II. CAST—The milled mix (slurry) is placed into a cast aluminum siphon cup containing a removable plastic bag. The casting machine has a 500-ft. roll of 6-inch wide by 0.006-inch thick silicone-coated paper threaded through the rollers and take-up pulleys of the machine.

The siphon cup is pressurized at 1.5 psi with nitrogen forcing the slurry out through a plastic tube and into a hopper. The hopper contains a portion of the slurry while allowing some to bleed under its doctor blade. The height of the doctor blade above the coated paper determines the thickness of the slurry upon the coated paper (usually 0.009" to 0.011" thick). The paper travels across the top for the casting machine at approximately 0.5 inches per second, allowing the slurry to dry into a slip prior to reaching the end of the machine's seven-ft length. As the paper is re-rolled within the body of the machine, the slip is stripped from the paper and rolled on itself. The resulting ceramic tape is from 0019-0.002 inch thick and 5 inches wide. The ceramic tape is cut into 6-ft. lengths and folded at 4-in. intervals until 30 layers are folded to yield a combined thickness of approximately 0.050 inches. This process yields ceramic bars, each 4 inches long, 5 inches wide and 0.050 inch thick.

III. ELECTRODE PREPARATION—The same type of coated paper used in casting is threaded through a silk screen printing machine. The proper screen is mounted and aligned. An electrode with composition of 30% palladium and 70% silver is screened onto the coated side of the paper. [Such a composition may be obtained from American Electronic Materials, Inc. of San Diego, Calif.]

IV. ELECTRODING PROCESS—The electrode is transferred to the 4×5×0.05 inch bar as follows:

Place the paper containing the electrode material with the electrode surface facing up. Lay the ceramic bar on the top to make contact with the electrode. Place another paper containing the electrode surface on top of ceramic bar with the electrode surface facing down. The metal electrodes should be in contact with the top and bottom of the ceramic bar.

The sandwiched bar is then punched through by pressing at 900 psi.

V. LAMINATION—The pressed squares are placed into a steel die and laminated together for 20 minutes at 140 degrees F. and 3570 psi, then removed from the die and the coated paper is peeled off. The electrode material stays on the ceramic.

VI. CUT—The wafers or chips are prepared from the laminated bar by cutting them apart with a razor blade mounted into a cutting machine.

As an alternative step, these wafers can also be prepared from ceramic materials with appropriate binders either by extrusion or by a compacting process to yield the desired thickness, length and width of the wafers. The electrode material is transferred to the wafers by following steps III through VI above.

VII. BISK—Three wafers are placed on each zirconia setter with one piece of 24-thousandth thick alumina atop them. The loaded setters are placed into a programmable Blue M oven, manufactured by Blue M Corporation of Blue Island, Ill. The bisk (bisque) protocol is as follows:

| TEMPERATURE | RAMP TIME | HOLDING TIME @ PRESCRIBED TEMPERATURE |
|---|---|---|
| Rm. Temp.-65 degrees C. | 1 hour | 10 hours |
| 065-100 degrees C. | 1 hour | 12 hours |
| 100-125 degrees C. | 1 hour | 17 hours |
| 125-150 degrees C. | 1 hour | 10 hours |
| 150-163 degrees C. | 1 hour | 20 hours |
| 163-175 degrees C. | 1 hour | 12 hours |
| 175-200 degrees C. | 1 hour | 18 hours |
| 200-212 degrees C. | 1 hour | 6 hours |
| 212-225 degrees C. | 1 hour | 12 hours |
| 225-275 degrees C. | 1 hour | 12 hours |
| 275-325 degrees C. | 1 hour | 5 hours |

VIII SINTERING—The bisked parts on the setters are transferred to a pusher-type tunnel kiln. The total cycle from start to finish is approximately seven hours. The soak time at peak firing temperature of 1120 degrees C. is 90 minutes.

IX. HOT GAS DIFFUSIONS—The fired parts are transferred to a specially designed hot isostatic press. Oxygen is pumped into the press to a pressure of 90 psi and then argon is added until a total pressure of 4510 psi is reached. The temperature of the furnace is raised from room temperature to 940 degrees C. in the following sequence:

| TEMPERATURE | TIME TO RAMP | HOLDING TIME FOR THE TEMPERATURE |
|---|---|---|
| Rm. Temp to 680 degrees C. | 6 mins. | 5 mins. |
| 680-770 degrees C. | 6 mins. | 5 mins. |
| 770-940 degrees C. | 6 mins. | 10 mins. |

The heater is turned off after the last sequence and the pressure is held until the furnace is cooled to 125 degrees C. The pressure is released and the parts are removed.

X. ASSEMBLY—These wafers as outlined previously are used for the assembly of the high energy density capacitors.

BRIEF DESCRIPTION OF THE DRAWING

A better understanding of the present invention may be realized from a consideration of the following detailed description taken in conjunction with the accompanying drawing in which:

FIG. 1 is a perspective view of an integral capacitor comprising a plurality of individual capacitor chips in accordance with the present invention;

FIG. 2 is a schematic view of one of the capacitor chips in accordance with the present invention;

FIG. 3 is a schematic plan view of a plurality of capacitor chips like that of FIG. 2 in an early stage of assembly;

FIG. 4 is a schematic plan view of a plurality of capacitor chips like that of FIG. 2 in a further stage of assembly;

FIG. 5 is a schematic plan view of an array of capacitor chips assembled in a finished integral capacitor unit.

DESCRIPTION OF THE PREFERRED EMBODIMENT

Figure 6:
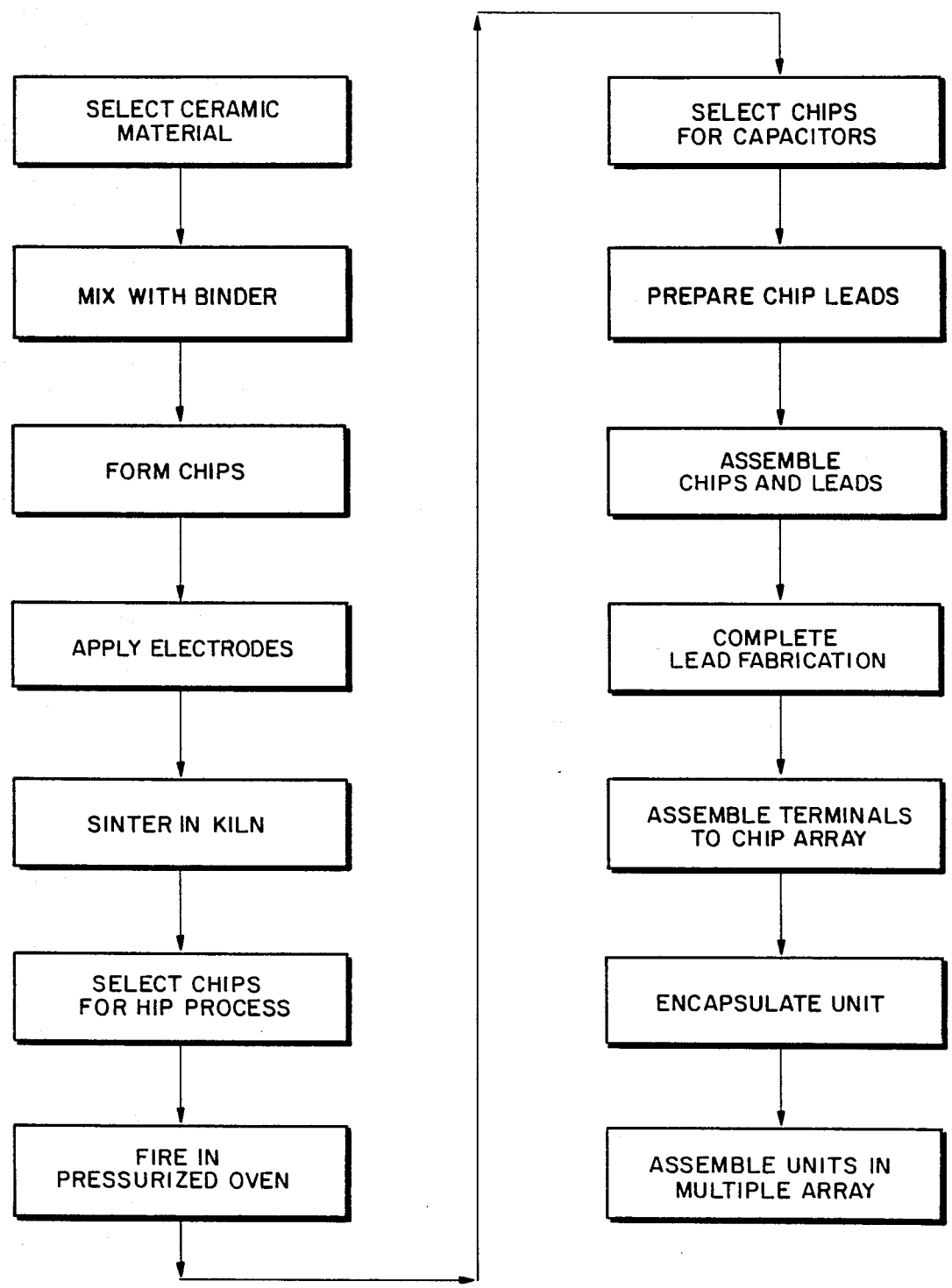
FIG. 6 is a block diagram showing a preferred method of fabrication of capacitors in accordance with the present invention.

FIG. 1 represents an integral capacitor 10 in accordance with the present invention comprising the double array 12a and 12b of individual capacitor chips 14 as more particularly shown in FIG. 2. Each array 12a and 12b is in the form of an encapsulated unit like that of FIG. 5.

Each individual capacitor 14 is formed of an individual ceramic block 20 approximately 1 inch square with rounded edges and less than 1/16 inch thick. Each of the opposite major faces 22, 24 of the block 14 may be coated with a thick film electrode (not shown) which is applied as an electrode ink or paste prior to firing of the chip or block 20. Conductor plates 26 and 28 are shown in position along the opposite faces 22, 24 of the block 20. These are interspersed with individual chips 20 during assembly of the chips to form the basic unit of FIG. 5. The conductor plates or leads 26, 28 extend outwardly from between the stacked chips, alternating from side to side as shown in FIG. 3 to constitute the leads of the respective capacitors. Thus an individual lead, such as 28, serves as the plate for both of the capacitor chips 20 on opposite sides of that lead, the other plates being provided by the two leads 26 which straddle the particular lead 28 and the corresponding chips 20. This arrangement is carried throughout the stack. In effect, therefore, the individual chips 20 are electrically connected in parallel by pairs. The conducting plates 26, 28 are relatively thin, approximately 0.010 inch in thickness, and formed of copper, a ductile material, which makes them readily bendable against the sides of the array, as shown in FIGS. 4 and 5.

After the set of chips 20 are installed in an array 12, the extending conductor ends 30, 32 are bent through approximately 90 degrees in opposite directions, relative to each other, as indicated by the arrows in FIG. 3, to extend along the array 12 on opposite sides thereof. The ends 30, 32 are soldered together by sets on the opposite sides of the array so that a pair of common leads is developed connecting to plates of al of the capacitor chips 20 in the basic array. A metallic bus member 50, 52 is affixed by soldering to the leads 30, 32 at opposite ends of the array as shown in FIG. 5, and terminal members 54, 56 are affixed thereto for external circuit connection. After assembly in the manner described and as indicated in FIG. 5 to form a basic array 12, the entire unit is encapsulated with a suitable potting compound as indicated by the irregular outline 60 in FIG. 5.

Two or more of the basic arrays 12 of FIG. 5 may be connected together in the manner shown schematically in FIG. 1 if it is desired to increase the overall capacitance beyond that of a single array 12. An external connection 57 is shown at one end of the capacitor 10, having a pair of connector terminals 54 ganged internally to the respective bus members 50 extending along the left side of the double array 12a, 12b. For simplicity of display, the bus members 52 along the near side of the arrays 12a, 12b are omitted from FIG. 1, although the opposite terminal 58 of the capacitor 10 to which the bus members 52 would connect is barely visible at the distal end of the integral capacitor 10. As shown in FIG. 1, the internal housing 60 of the capacitor 10 is formed of transparent plastic for display purposes.

FIG. 6 is a flow chart indicating the basic steps in the fabrication of high energy density capacitors in accordance with the present invention as described hereinabove. In essence, the basic steps comprise selecting a ceramic material of the $ABO_3$ perovskite type which has been prepared to sub-micron particle size, mixing the material with a binder, forming the mixture in final form with electrodes on opposite faces thereof and fabricating to form chips. The material can be put in final form by casting, extruding or compressing methods as described hereinabove. These chips are then placed in a kiln for sintering by firing within the kiln at a selected temperature approximately 90-98% of the maturing temperature for the material.

After completion of the first kiln phase of the process, fired chips are then tested and selected for further processing by hot isostatic pressing. This involves firing the chips in a pressurized oven at controlled temperatures and pressures in a selected gas mixture. Thereafter, the chips undergo further testing and final selection for use in the capacitors to be fabricated therefrom. The individual capacitor chip leads are prepared and assembled with the chips in a preliminary stacked array. The extended portions of the individual leads are bent along opposite sides of the array and soldered together. Terminals are prepared and connected to the respective leads. The entire assembly is then encapsulated in a suitable insulating medium t provide a finished basic unit. If increased capacitance is desired, a plurality of units may be ganged together in parallel to form a multiple array.

Although there have been shown and described hereinabove specific arrangements of a high energy density capacitor and method of fabrication in accordance with the invention for the purpose of illustrating the manner in which the invention may be used to advantage, it will be appreciated that the invention is not limited thereto. For instance, the individual capacitor chips could also be formed into a monolithic capacitor unit by using the conventional techniques used in the ceramic multilayer capacitor industry by those skilled in the art. Accordingly, any and all modifications, variations, or equivalent arrangements which may occur to those skilled in the art should be considered to be within the scope of the invention as defined in the annexed claims.

What is claimed is:

1. The method of fabricating high energy density capacitors comprising the steps of:

selecting a ceramic material;

mixing the material with a binder;

forming chips of a predetermined shape and size from the mixture of material and binder;

placing the formed chips in a kiln for sintering at a selected elevated temperature for a selected interval;

thereafter cooling the sintered chips to room temperature at a controlled rate and removing the chips from the kiln;

selecting chips for further processing from those prepared by the sintering operation;

placing the selected sintered chips in a pressurized oven for hot isostatic pressing (HIP);

operating the pressurized oven at selected temperatures, times and pressures in an atmosphere of a selected gaseous mixture;

after conclusion of the HIP process, reducing the oven pressure and temperature at a controlled rate to bring the contents to room temperature;

selecting chips prepared by the HIP process for inclusion in a capacitor array;

preparing a plurality of thin, flat, electrically conductive leads;

assembling the chips and the leads by interspersing them alternately to form an array wherein alternate leads extend outwardly from the array in opposite directions;

bending the extending portions of the leads through nearly 90 degrees to extend along opposite sides of the array in two sets, the leads of a given set being in continuous contact along the array;

affixing the leads of a set together in electrically and mechanically connected juxtaposition; and applying a pair of external terminals, one to each set of leads, to provide electrical connections to opposite sides of the individual capacitor chips, all connected electrically in parallel.

2. The method of claim 1 wherein the selected ceramic material is prepared to sub-micron particle size.

3. The method of claim 1 wherein the selected ceramic material is of the $ABO_3$ perovskite type where A belongs to a divalent cationic species of the group consisting of Mg, Ca, Ba, and Sr; B belongs to a quadrivalent species of the group consisting of Ti, Sn, Pb, and Zr; and O represents oxygen.

4. The method of claim 3 wherein the ceramic material is selected from barium titanate compositions of the group consisting of NPO, X7R, and Z5U, as classified by the Electronics Industry Association.

5. The method of claim wherein the selected ceramic material is Tamtron 262-L.

6. The method of claim 1 wherein the step of forming the chips comprises fabricating the mixture in tape form to a predetermined thickness and cutting the tape to form the individual capacitor parts.

7. The method of claim 6 further including the step of applying thick film electrodes to opposite sides of the tape prior to cutting into individual parts.

8. A high energy density capacitor fabricated in accordance with the method of claim 7.

9. The method of claim 1 wherein the working temperature of the kiln during the sintering step is approximately 90-98% of the peak firing temperature specified for the material.

10. The method of claim 9 wherein the selected material has a specified peak firing temperature of approximately 1130 degrees C.

11. The method of claim 10 wherein the time duration of the sintering process is in the range of from one to three hours.

12. The method of claim 11 wherein the step of cooling to room temperature at a controlled rate takes place over a period of about two hours.

13. The method of claim 1 wherein the step of selecting the sintered chips includes testing to design specifications and thereafter loading the selected chips into an inert crucible with suitable separation between the pieces and placing the crucible of chips in the pressurized oven.

14. The method of claim 1 wherein the working temperature during the HIP process is within a range of 25–150 degrees C. below the normal maturing temperature of the material for pressures within a range of about 2000 psi to about 12,000 psi.

15. The method of claim 14 wherein the working temperature maintained during the HIP process is approximately 25 to 150 degrees C. below the maturing temperature of the material at a working pressure in the range of 2000 to 12,000 psi.

16. The method of claim 14 wherein the maturing time in the HIP process is approximately 15 to 60 minutes at approximately 25 to 150 degrees C. below the maturing temperature of the material at a working pressure in the range of 2000 to 12000 psi.

17. The method of claim 14 wherein the selected material is a barium titanate composition having a maturing temperature of approximately 1130 degrees C.

18. The method of claim 17 wherein the gas mixture provided in the pressurized oven during the HIP process includes at least one of the gases in the group consisting of helium, neon, argon, krypton, and nitrogen, plus oxygen in the range of about 2 to about 5%.

19. The method of claim 18 wherein said gas mixture comprises a selected combination of gases from said group.

20. A high energy density capacitor fabricated in accordance with the method of claim 19.

21. A high energy density capacitor fabricated in accordance with the method of claim 14.

22. A high energy density capacitor fabricated in accordance with the method of claim 1.

23. A high energy density capacitor comprising:

a plurality of individual ceramic capacitor chips interspersed in an array with a plurality of thin electrical conductors, each conductor being of sufficient lateral extent to substantially cover the faces of adjacent capacitors in the array, each conductor having a bendable lead portion extending beyond the edge of adjacent capacitor chips;

said extending portions being bent into contact with adjacent lead portions to extend along the side of the array;

means affixing the bent lead portions in said juxtaposition extending along the sides of the array and electrically connecting the leads together in two sets on opposites sides of the array; and a pair of terminal members respectively connected to the two sets of leads to connect all of the individual capacitive chips in parallel in a single integral capacitor.

24. The device of claim 23 further including a mass of encapsulating material enveloping the individual capacitor chips and leads of the array.

25. The device of claim 23 wherein each individual chip includes a conducting plate member along each face of the chip.

26. The product of claim 25 wherein each chip is approximately one inch square and has a thickness within the range of about 0.001 inch to about 0.1 inch.

27. The device of claim 26 wherein each chip is approximately 0.02 inches thick.

28. The device of claim 26 wherein each chip is approximately 0.04 inches thick.

29. A high energy density capacitor comprising a plurality of arrays as defined in claim 23 all connected together in parallel, and further comprising respective terminal means electrically connected to the terminal members of each of said arrays.

* * * * *